(12) United States Patent
Morrison et al.

(10) Patent No.: US 6,381,663 B1
(45) Date of Patent: *Apr. 30, 2002

(54) MECHANISM FOR IMPLEMENTING BUS LOCKING WITH A MIXED ARCHITECTURE

(75) Inventors: John A. Morrison; Robert J. Blakely; Eric M. Rentschler, all of Ft. Collins; John R. Feehrer, Loveland, all of CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,718

(22) Filed: Mar. 26, 1999

(51) Int. Cl.[7] .............................................. G06F 13/00
(52) U.S. Cl. ........................ 710/108; 710/200; 709/200
(58) Field of Search ................................ 710/108, 128, 710/200, 52, 112, 305, 313, 315, 100; 709/200

(56) References Cited

U.S. PATENT DOCUMENTS

| | | | |
|---|---|---|---|
| 4,587,609 A | 5/1986 | Boudreau et al. ............ 364/200 |
| 4,622,630 A | 11/1986 | Vora et al. .................... 364/134 |
| 5,467,295 A | 11/1995 | Young et al. ........... 395/200.05 |
| 5,548,780 A | 8/1996 | Krein ........................... 395/825 |
| 5,572,734 A | 11/1996 | Narad et al. ................. 395/726 |
| 5,664,092 A | * 9/1997 | Waites .......................... 714/25 |
| 5,696,939 A | * 12/1997 | Iacobovici et al. .......... 711/150 |
| 5,737,545 A | * 4/1998 | Wszolek et al. ............. 710/108 |
| 5,925,099 A | * 7/1999 | Futral et al. ................. 709/204 |
| 6,134,619 A | * 10/2000 | Futral et al. ................. 710/112 |

* cited by examiner

Primary Examiner—Xuan M. Thai

(57) ABSTRACT

An apparatus and method for permitting bus locking in a computer system having a mixed architecture. The mixed architecture includes a first bus coupled to processors that may run applications using bus locking or cache line locking. The apparatus interfaces the first bus with a second bus that does not support bus locking. The apparatus when presented with a locked transaction effectively implements bus locking on the second bus.

20 Claims, 4 Drawing Sheets

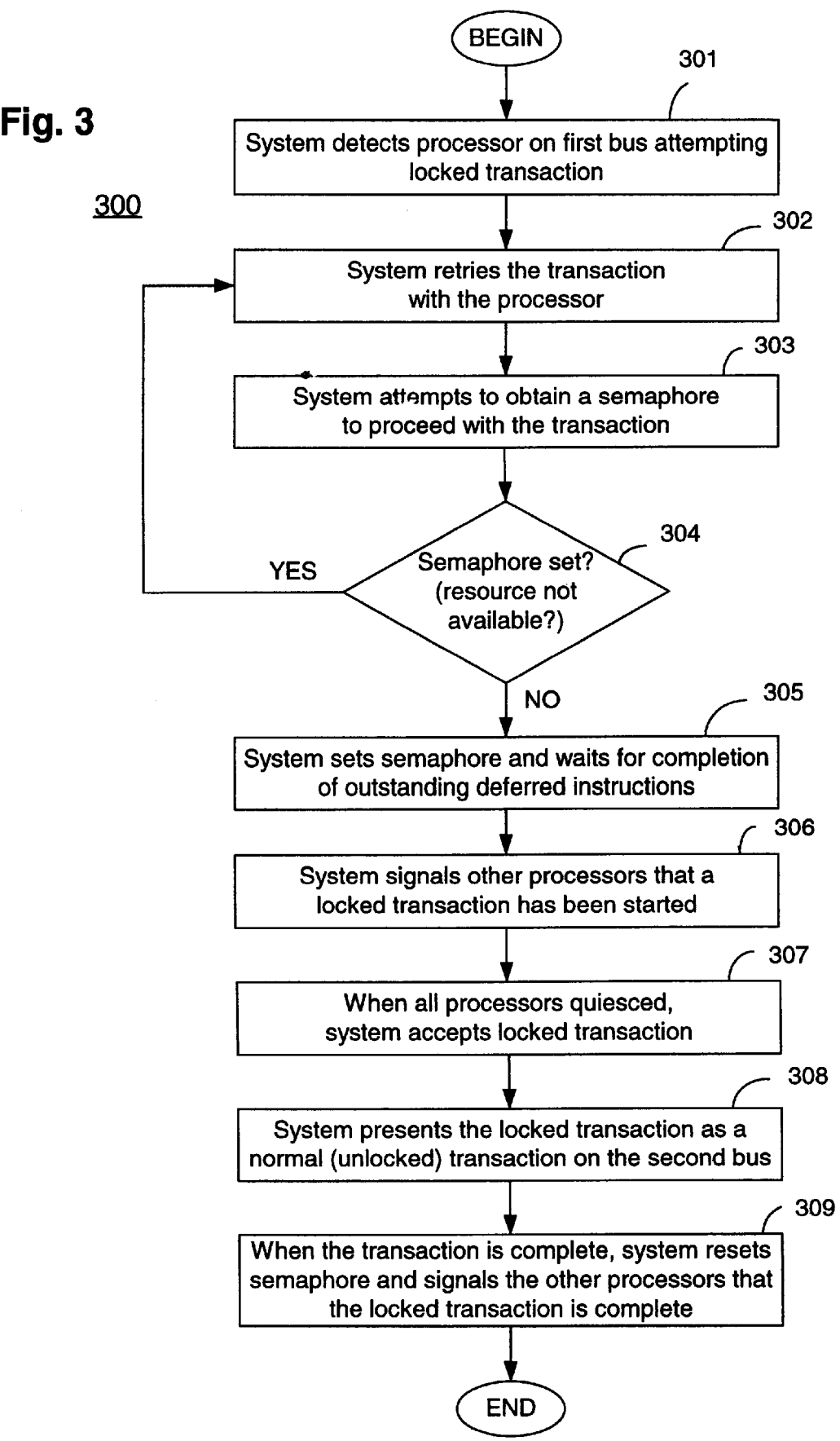

MECHANISM FOR IMPLEMENTING BUS LOCKING WITH A MIXED ARCHITECTURE

FIELD OF THE INVENTION

The present invention relates to an apparatus and method for implementing bus locking in computer systems having mixed types of architecture.

BACKGROUND OF THE INVENTION

Bus locking is used in computer systems having multiple processors in order to synchronize transactions among the processors. The synchronization is required so that two or more processors do not access the corresponding bus at the same time for certain transactions, which may cause data corruption in the system or malfunctioning of the attempted transactions. In traditional bus locking, the processors use a register in order to identify whether any of the processors have requested a lock on the bus. If one of the processors has locked the bus, as identified by a status of the register, the other processors refrain from issuing transactions on the bus until the status of the register indicates unlocking of the bus. Therefore, in order to synchronize the processors, as one processor performs a locked transaction all other processors are locked out of the bus. The processor performs the transaction and then resets the register, permitting other processors in the system to access the bus.

Some systems having multiple processors permit multiple access to a bus through a process referred to as pipelining or cache line locking. In this type of system, the processors use a built-in protocol when issuing transactions on the bus. Therefore, the system uses the protocol to properly maintain and execute transactions issued on the bus by multiple processors.

Since the protocol synchronizes the transactions, bus locking is not necessary in those systems. Therefore, the systems using cache line locking typically do not support bus locking. Certain applications operating on processors within such a multi-processor system, however, use the traditional bus locking rather than the cache line locking method. If that application attempts a locked transaction, it will be unable to obtain a lock on the bus. Accordingly, the system must either accommodate both traditional bus locking and cache line locking or only run applications using cache line locking. Limiting the system to cache line locking applications may significantly limit the versatility of the system, and in some situations it may not be possible or practical to limit the applications in that manner.

Accordingly, the need exists for an apparatus and method to accommodate bus line locking and cache line locking in a system having a mixed architecture.

SUMMARY OF THE INVENTION

A method consistent with the present invention permits locked transactions within a computer system interfacing processors on a first bus that supports bus locking with a second bus that does not support bus locking. The method includes detecting via the first bus an indication of a request for a locked transaction requiring a shared resource in the system, and obtaining the resource required for the transaction. When the resource is obtained, an indication of the locked transaction is signaled to the processors in the system to quiesce the system, and the locked transaction is sent via the second bus for execution. When the locked transaction completes, the resource is relinquished to allow future locked transactions.

An apparatus consistent with the present invention permits locked transactions within a computer system interfacing processors on a first bus that supports bus locking with a second bus that does not support bus locking. The apparatus detects via the first bus an indication of a request for a locked transaction requiring a shared resource in the system, and it obtains the resource required for the transaction. When the resource is obtained, the apparatus signals to the processors in the system an indication of the locked transaction to quiesce the system and sends via the second bus the locked transaction for execution. When the locked transaction completes, the resource is relinquished to allow future locked transactions.

BRIEF DESCRIPTION OF THE DRAWINGS

The accompanying drawings are incorporated in and constitute a part of this specification and, together with the description, explain the advantages and principles of the invention. In the drawings.

FIG. 3 is a flow chart of a process for implementing bus locking in a system having a mixed architecture.

DETAILED DESCRIPTION

Embodiments consistent with the present invention effectively permit bus locking in a system having a bus that does not use traditional bus locking. Systems with a mixed architecture typically include different types of buses. One type of bus is required for communication between local processors in the system, and a second type of bus is required for communication with memory, remote processors, and peripheral devices. Controllers interface the processors on the first bus with the second bus. When the second bus does not support traditional bus locking, the controllers function to effectively implement bus locking for transactions or instructions issued by particular applications running on the processors.

Figure 1:
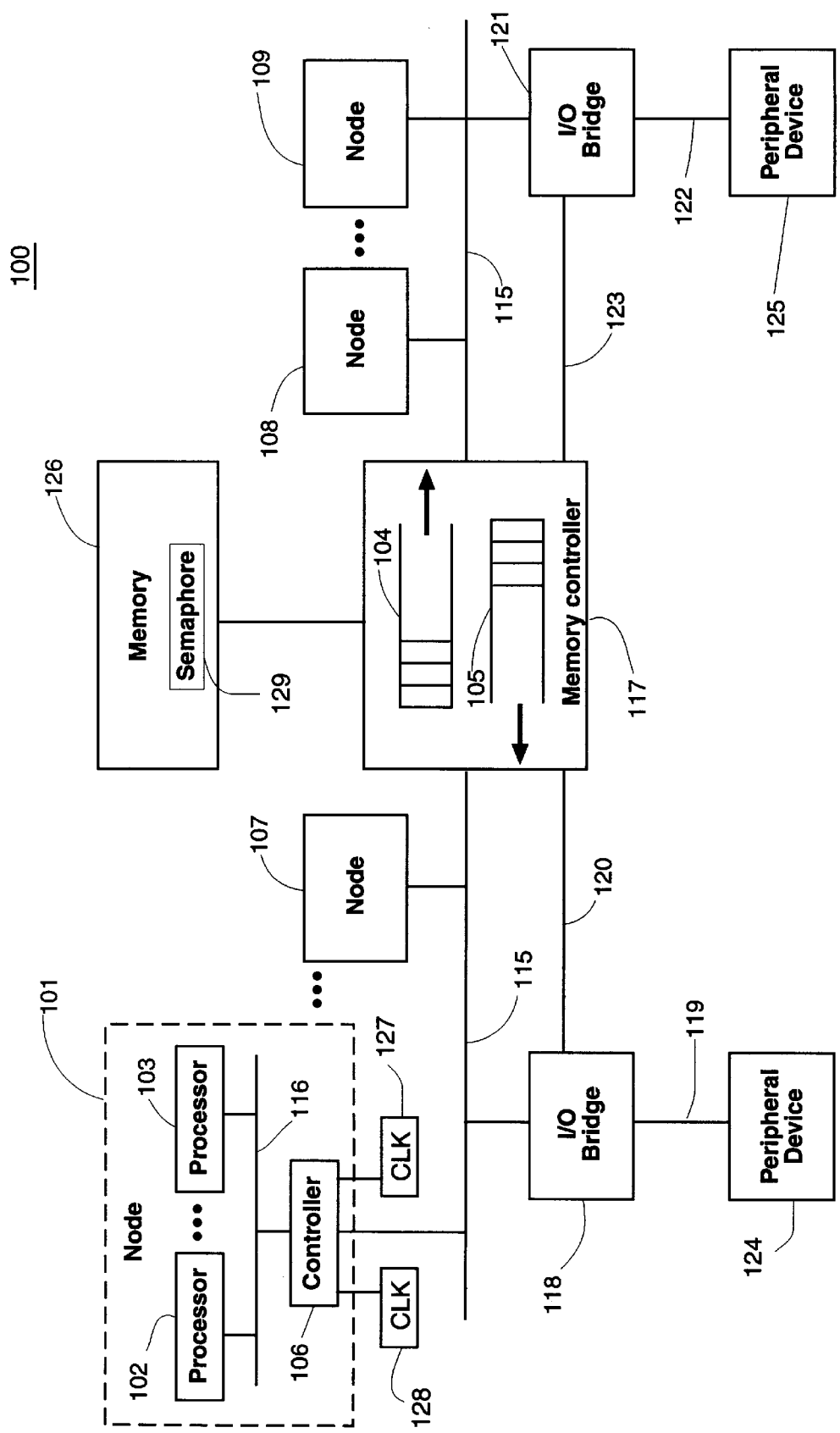
FIG. 1 is a diagram of an exemplary computer system for implementing bus locking in a system having a mixed architecture.

FIG. 1 is a block diagram of an exemplary computer system 100 having a mixed architecture and including components for implementing bus locking in the system. In system 100, a plurality of nodes 101 and 107–108 each typically include a plurality of processors. As shown for example in node 101, two or more processors 102 and 103 are coupled along a bus 116 to a controller 106. Controller 106 includes terminals for electrical connection with bus 116 and a bus 115, and controller 106 interfaces processors 102 and 103 on bus 116 with bus 115. Bus 116 for processors 102 and 103 typically has a different capacity than bus 115. For example, processors 102 and 103 may operate on a 32-bit bus 116; however, controller 106 may interface them with a 64-bit bus 115.

The mixed architecture may be implemented such that processors having a reduced byte length are connected to and operate with a higher capacity bus for use with improved performance of memory and peripherals. Processors 102 and 103 may be implemented with any type of processor, such as a product within the Pentium® Pro line of processors, also referred to as the P6 processor, by Intel Corp. Bus 116 may be implemented with any capacity and type of bus interfacing processors 102 and 103 with a controller, such as the 32-bit P6 bus. Likewise, bus 115 may be implemented with any capacity and type of bus interfacing a controller with a memory or an I/O bridge, such as a bus within the Merced architecture.

Bus 115 connects with a memory controller 117, which may be implemented with any device for controlling reading to and writing from a memory, such as any type of synchronous dynamic random access memory (DRAM) 126. Memory 126 may include a semaphore 129, used for executing locked transactions and typically implemented using an addressable location in memory 126. Memory controller 117 includes forwarding queues 104 and 105 for buffering transactions between buses 115.

Also connected with bus 115 are an input/output (I/O) bridge 118 and another I/O bridge 121. I/O bridge 118 is coupled to a peripheral device 124, and it interfaces peripheral device 124 with bus 115 using a connection 119. Likewise, I/O bridge 121 interfaces peripheral device 125 with bus 115 using a connection 122. Lines 120 and 123 provide for arbitration control between I/O bridges 118 and 121 and memory controller 117, and such arbitration techniques are known in the art. Each I/O bridge 118 and 121 may be implemented with any device for interfacing a peripheral device with a computer bus and such controllers are known in the art. Each peripheral device 124 and 125 may be implemented with any type of computer peripheral such as a keyboard, cursor control device, input device, or output device.

System 100 also includes a global bus clock 127 for controlling components connected to bus 115 and a local bus clock 128 for controlling components connected to bus 116. Controller 106 typically includes connections to both local bus clocks 127 and 128 for controlling and synchronizing the interfacing of buses 115 and 116. The other components in system 100 also include a connection to local bus clocks 127 or 128, depending upon the bus on which they operate.

Each of the additional nodes 107–109 are also coupled with bus 115. Each of these nodes 107–109 typically includes a controller, similar to controller 106, coupled with a plurality of processors and local bus clocks 127 and 128, similar to the configuration shown in node 101. The other nodes 107–109 also typically include a bus 116 for coupling their processors to a controller. Accordingly, each of the nodes 101 and 107–109 interface processors on a first type of bus with a second type of bus.

Typically, bus 116 supports bus locking, and bus 115 does not support bus locking because it uses instead cache line locking or another synchronization method for improved performance of memory and peripherals. Therefore, controller 106, and the corresponding controllers in nodes 107–109, function to accomplish the effect of bus locking on bus 115. If an application running on one of the processors 102 and 103, for example, uses cache line locking, controller 106 passes transactions through to bus 115 transparently. On the other hand, if an application running on one of the processors 102 and 103 uses bus locking, controller 106 operates to virtually implement bus locking on bus 115.

Figure 2A:
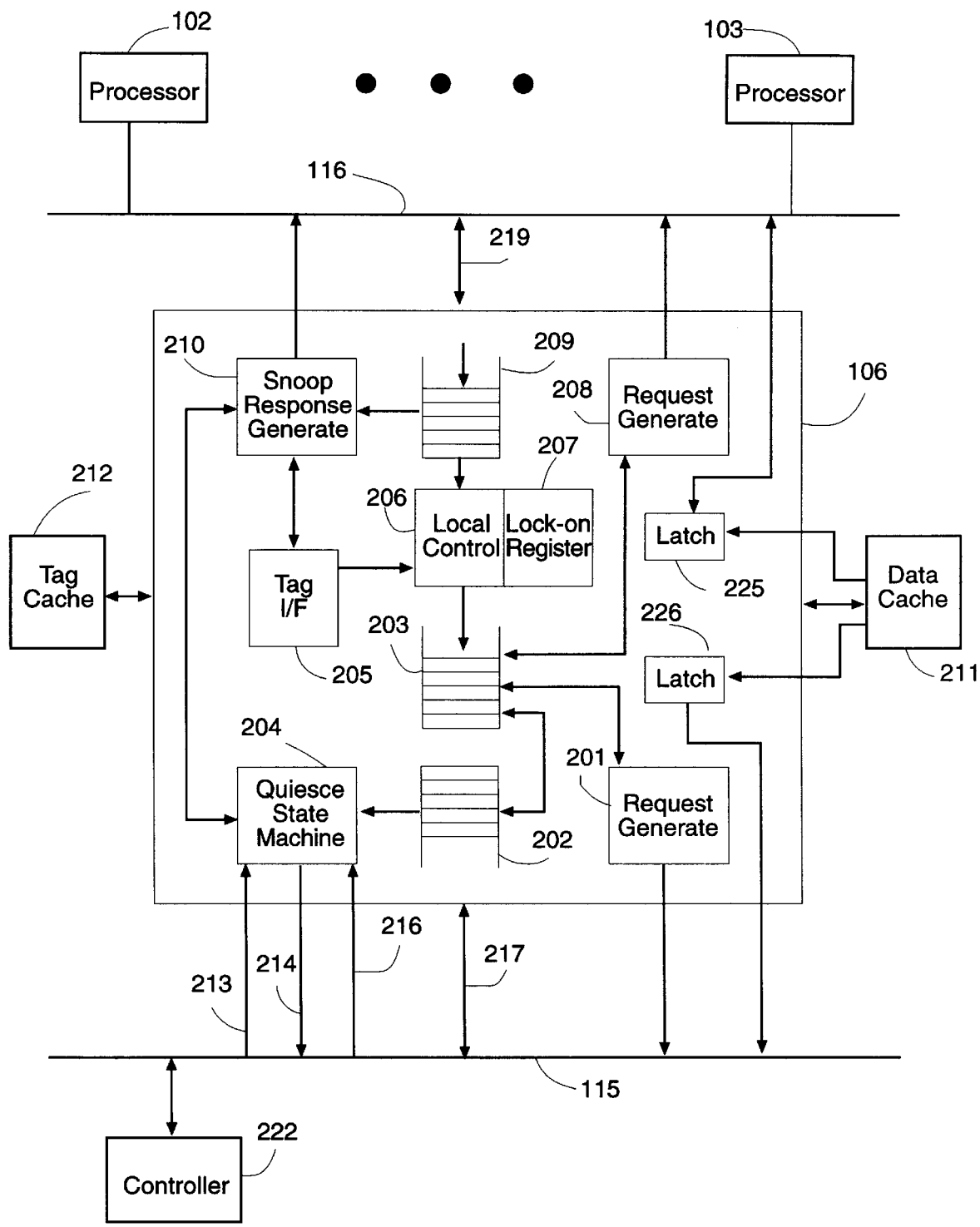
FIG. 2A is a block diagram of resources used in a controller executing a locked transaction in a system having a mixed architecture.
Figure 2B:
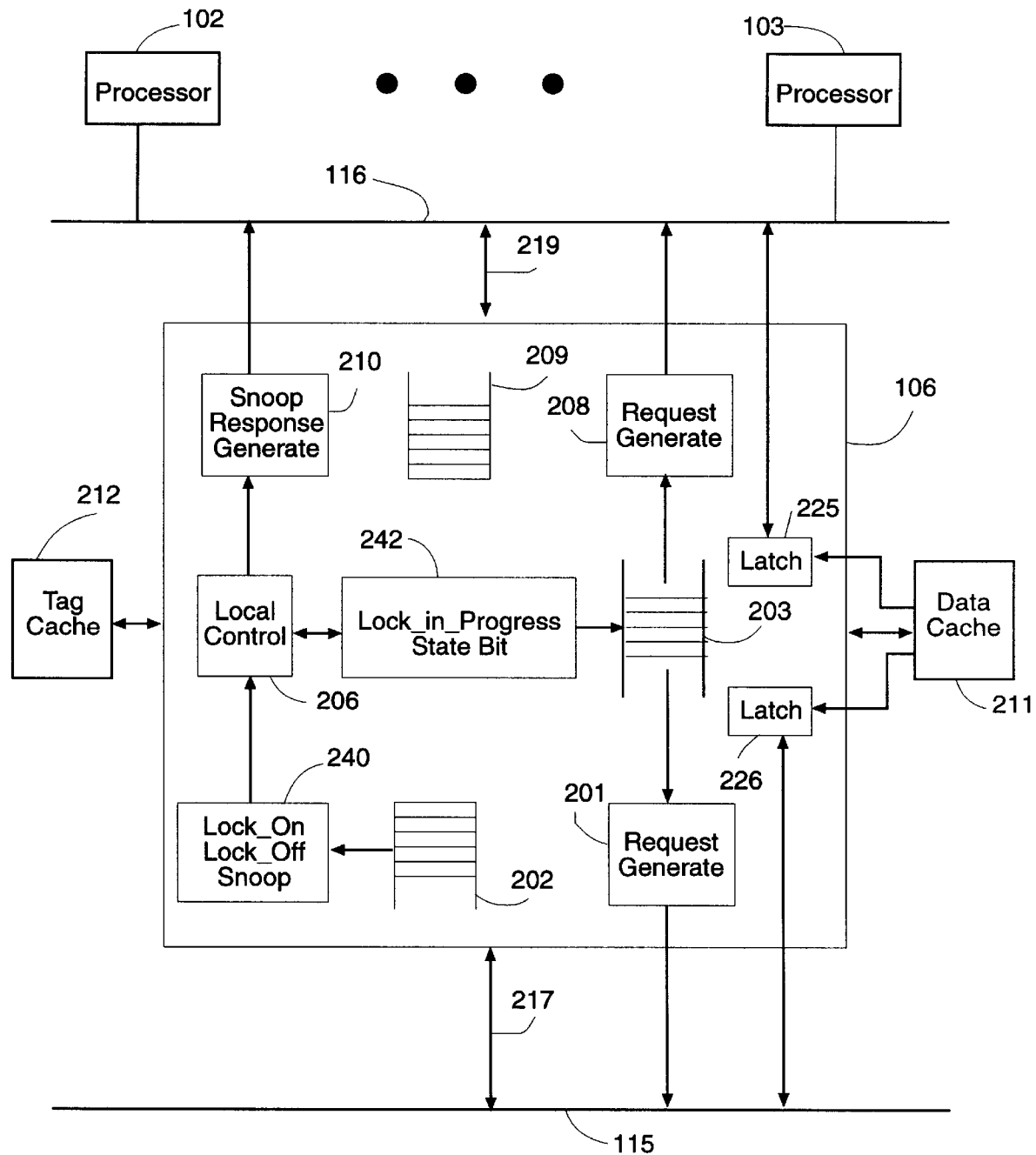
FIG. 2B is a block diagram of resources used in other controllers while another controller executes a locked transaction in a system having a mixed architecture.

FIGS. 2A and 2B are block diagrams showing modules or elements for implementing hardware functions in controller 106 for effectively performing bus locking on bus 115. The other nodes 107–109 typically include similar functions in their controllers for implementing bus locking. Although an embodiment is shown using hardware components, the bus locking may alternatively be accomplished using modules including a processor operating under control of software or firmware, or a combination of software processing and specialized hardware components.

FIG. 2A is a block diagram illustrating hardware functions of resources used in controller 106 executing a locked operation between bus 116, which supports locked transactions, and bus 115, which does not support locked transactions. As shown in FIG. 2A, controller 106 includes a plurality of modules representing hardware functions for executing a locked transaction on bus 115. Controller 106 includes an input/output queue (IOQ) 209 coupled to bus 116, a snoop response generation 210, and a local control 206. Local control 206 is connected to a lock_on register 207 and to a processor queue 203. Snoop response generation 210 is also connected with a quiesce state machine 204 and tag I/F 205.

Processor queue 203 is coupled to a request generate 201 and request generate 208. An IOQ 202 is connected to processor queue 203 and quiesce state machine 204. In addition, IOQ 202 is connected to bus 115 via connection 217. Bus 115 represents the second bus not supporting a locked transaction and is coupled to the other controllers, for example, controller 222, which may correspond to a controller in one of the nodes 107–109. Controller 106 includes an associated data cache 211 and tag cache 212, both which may be implemented with off-chip random access memory (RAM). Also, controller 106 is coupled to bus 116 via connection 219. Bus 116 includes connections to the processors, such as processor 223 and 224 in node 101, and typically supports use of a locked transaction.

The hardware modules shown in FIGS. 2A and 2B are implemented, for example, using logic gates to perform the functions described below or equivalent functions. The sequence of the modules performing the functions is typically implemented using clock signals from bus clocks 127 and 128 that drive components connected to buses 115 and 116, respectively. In this example, quiesce state machine 204 and request generate 201 are clocked using global bus clock 127 for bus 115, and the other modules of controller 106 for performing bus locking are clocked using local bus clock 128 for bus 116.

In operation, controller 106 receives a request for a locked transaction from one of the processors 223 and 224 via bus 116 and connection 219. IOQ 209 receives and stores the locked transaction. In response, snoop response generation 210, interacting with IOQ 209, retries the transaction on bus 116 while setting an associated lock number pin. In parallel with retrying it, the transaction is transferred via local control 206 to processor queue 203, which in turn notifies request generate 201. In response, request generate 201 issues an invalidate transaction to a location of a lock_on address in memory 126 in order to acquire semaphore 129. Once it has acquired semaphore 129, request generate 201 sends a notification that semaphore 129 is acquired through IOQ 202 and quiesce state machine 204 to snoop response generation 210.

When snoop response generation 210 is notified that semaphore 129 is acquired, it notifies local control 206 via tag I/F 205. Local control 206 in turn receives the transaction from IOQ 109, reformats the requested transaction, and performs translation of it to execute the transaction on bus 221. Since bus 115 has a different capacity than bus 116, the reformatting involves converting a memory address related to the transaction, and possibly commands, for execution using the capacity of bus 115. In addition, local control 206 stores in lock_on register 207 an address indicating a location of semaphore 129 in memory 126.

Snoop response generation 210, in parallel with retrying the transaction, also notifies quiesce state machine 204 of the pending locked transaction. In response, quiesce state machine 204 issues an input/output kill (IOKILL) signal on line 214. IOKILL signal 214 notifies the I/O bridges within the system, via bus 115, to stop issuing transactions because of a pending locked transaction. When bus 115 is clear of transactions, an input/output acknowledge (IOACK) signal 213 received from other controllers in the system, via bus 115, acknowledges that they have completed issuing their pending transactions. Controller 106 and the controllers in nodes 107–109 may use sideband signals to issue and receive IOKILL signal 213 and IOACK signal 214.

After controller 106 obtains semaphore 129, it receives from memory 117 de-assertion of a bus priority agent (BPRI) signal 216, which is used by memory controller 117 as an arbitration signal indicating that memory 126 may receive the locked transaction. In particular, memory 117 asserts BPRI signal 216 when it forwards data from one side of bus 115 to the other (see FIG. 1), and it de-asserts BPRI signal 216 when forwarding queues 104 and 105 are empty, indicating that system 100 is quiesced. The term quiesced means that the locked transaction may issue on an associated bus required or used for the transaction, and in this example it means bus 115 is clear of pending transactions from other processors and memory 117 may receive the locked transaction.

In response to the IOACK signal 213, quiesce state machine 204 sends an acknowledgment to processor queue 203. Therefore, once bus 115 is clear of transactions and memory 117 may accept the locked transaction, request generate 201 issues the locked transaction and may write data through latch a 226 into date cache 211. In particular, for a write operation request generate 201 fetches the data and latches it into latch 226 and then buffers the data to cache data 211. Cache data 211 may independently transfer data to memory 126 using memory controller 117. For a read operation cache data 211 obtains the data from memory 126 using memory controller 117 and the associated address of the data. Cache data 211 transfers the data to latch 126, and request generate 201 latches the data from latch 126 to the processor requesting it. Other types of locked transactions are possible with this bus locking scheme, such as transactions which perform two reads or two writes.

Once the locked transaction is complete, request generate 201 issues an invalidate transaction to a location of a lock_off address to release semaphore 129 in memory 126. Once semaphore 129 is released, the other processors in system 100 may continue issuing transactions on bus 115. The lock_on and lock_off signals are implemented, for example, using the lower and upper halves, respectively, of a 64-bit cache line.

FIG. 2B is a block diagram of hardware resources used in controller 106, for example, while another controller issues a locked transaction. Each controller typically includes the functions shown in both FIGS. 2A and 2B such that each controller may issue a locked transaction and block pending transactions while other controllers issue a locked transaction. As shown in FIG. 2B, controller 106 in addition to the elements shown in FIG. 2A also includes a lock_on and lock_off snoop 240 and a lock_in_progress state bit 242 used by local control 206.

In operation, lock_on lock_off snoop 240 detects the invalidate transaction to a location of the lock_on address using bus 115 in order to know that another controller has acquired semaphore 129 and wants to issue a locked transaction. Upon detecting the lock_on signal and acquired semaphore, lock_on lock_off snoop 240 passes an indication of the acquired semaphore to local control 206, which sets the lock_in_progress state bit 242. Local control 206 also notifies snoop response generate 210, which permits pending transactions to issue and blocks any new transactions. IOQ 209 stores outstanding transactions while the pending transactions issue and while subsequently the locked transaction from the other processor occurs on bus 115. The lock_in_progress state bit 242 also indicates to processor queue 203 that another controller has acquired semaphore 129 for a locked transaction. In response to setting of lock_in_progress state bit 242, request generate 201 completes pending transactions and blocks new transactions from issuing on bus 115 until after a lock_off signal is detected. Accordingly, with new transactions blocked, the controller acquiring semaphore 129 is free to issue the locked transaction on bus 115.

While that transaction occurs, request generate 208 is free to continue and complete transactions since it only interfaces bus 116 with memory 126. While the locked transaction occurs, lock_on lock_off snoop 240 continues to monitor bus 115 in order to detect the invalidate transaction to a location of the lock_off address from the controller executing the locked transaction, indicating completion of the locked transaction. In response to the lock_off signal, lock_on lock_off snoop 240 notifies local control 206 which in turn resets lock_in_progress state bit 242. With that bit reset, processor queue 203 is free to continue issuing transaction to request generate 201 for issuance on bus 115.

FIG. 3 is a flow chart illustrating a process of controller 106 implementing bus locking on bus 115. Controller 106, as explained above with respect to FIGS. 2A and 2B, typically implements these functions using hardware modules. However, it may also alternatively implement these functions in software or firmware controlling the operation of a processor in the controller. In process 300, the system detects a processor on bus 116 attempting a locked transaction (step 301); the "system" refers to, for example, controller 106 using the same or equivalent hardware functions shown in FIGS. 2A and 2B; alternatively, the system may use different hardware elements to implement the functions, or use software or firmware controlling a processor.

The system retries the transaction with the processor requesting the locked transactions (step 302). The system also attempts to obtain semaphore 129 to proceed with the transaction (step 303). The system determines if semaphore 129 is set, which indicates the resource required for the transaction is not available (step 304). If the resource is not available, the system continues to attempt to obtain semaphore 129. Otherwise, if the resource is available, the system sets semaphore 129 and waits for completion of outstanding deferred transactions from other processors (step 305). The system then signals the other processors, typically using sideband IOKILL signal 214, that a locked transaction has been started (step 306).

The system waits for other processors to be quiesced, and then it accepts the locked transaction (step 307). This step includes waiting for all of the processors both within node 101 and other nodes 107–109 in computer system 101 as well as the I/O bridges 118 and 121 to be quiesced by waiting for receipt of IOACK signal 213 and de-assertion of BPRI signal 216. Otherwise, a deadlock in the system may occur. After quiescing the other processors and entities in the system, the system presents the locked transaction as a normal (unlocked) transaction on bus 115 (step 308). When the transaction is complete, the system resets semaphore 129 to release (unlock) bus 115, and it signals to the other processors that the locked transaction is complete, typically using semaphore 129 (step 309). The other processors through their own bus interface controllers may then access bus 115 and proceed with their own transactions.

While the present invention has been described in connection with an exemplary embodiment, it will be understood that many modifications will be readily apparent to those skilled in the art, and this application is intended to cover any adaptations or variations thereof. For example, different numbers of processors per node, numbers of nodes, capacities of the buses, types of processors, types of buses, and labels for the various entities and buses may be used without departing from the scope of the invention. This invention should be limited only by the claims and equivalents thereof.

What is claimed is:

1. A method of permitting locked transactions within a computer system interfacing processors on a first bus that supports locked transactions with a second bus that does not support locked transactions, comprising:
   detecting via the first bus an indication of a request for a locked transaction requiring a shared resource in the system;
   obtaining the resource required for the transaction;
   signaling to the processors in the system, when the resource is obtained, an indication of the locked transaction to quiesce the system;
   sending via the second bus the locked transaction for execution; and
   executing locked transactions between the processors on the first bus during execution of the locked transaction on the second bus.

2. The method of claim 1 wherein the detecting includes checking a status of a register relating to locked transactions.

3. The method of claim 1 wherein the detecting includes attempting to obtain a semaphore relating to locked transactions.

4. The method of claim 1 wherein the signaling includes changing a status of a register to provide the indication of the locked transaction.

5. The method of claim 1, further including waiting, after the resource is available, for completion of deferred transactions within the computer system.

6. The method of claim 1, further including:
   determining when the locked transaction is complete; and
   signaling to the processors the completion of the locked transaction.

7. The method of claim 1 wherein:
   the detecting includes detecting via a 32-bit bus the indication of the request for the locked transaction; and
   the sending includes sending via a 64-bit bus the locked transaction for execution.

8. An apparatus for permitting locked transactions within a computer system interfacing processors on a first bus that supports locked transactions with a second busthat does not support locked transactions, comprising:
   a module that detects via the first bus an indication of a request for a locked transaction requiring a shared resource in the system;
   a module that obtains the resource required for the transaction;
   a module that signals to the processors in the system, when the resource is obtained, an indication of the locked transaction to quiesce the system;
   a module that sends via the second bus the locked transaction for execution; and
   a module that executes locked transactions between the processors on the first bus during execution of the locked transaction on the second bus.

9. The apparatus of claim 8 wherein the detecting module includes a module that checks a status of a register relating to locked transactions.

10. The apparatus of claim 8 wherein the detecting module includes a module that attempts to obtain a semaphore relating to locked transactions.

11. The apparatus of claim 8 wherein the signaling module includes a module that changes a status of a register to provide the indication of the locked transaction.

12. The apparatus of claim 8, further including a module that waits, after the resource is available, for completion of deferred transactions within the computer system.

13. The apparatus of claim 8, further including:
   a module that determines when the locked transaction is complete; and
   a module that signals to the processors the completion of the locked transaction.

14. The apparatus of claim 8 wherein:
   the detecting module includes a module that detects via a 32-bit bus the indication of the request for the locked transaction; and
   the sending module includes a module that sends via a 64-bit bus the locked transaction for execution.

15. The apparatus of claim 8, further including a queue for receiving the locked transaction.

16. The apparatus of claim 8, further including a latch for use in transferring data to a memory.

17. The apparatus of claim 8, further including a processor queue for use in executing the transaction on the second bus.

18. The apparatus of claim 8, further including:
   a memory; and
   a memory controller, coupled between the second bus and the memory, for use in forwarding data to and from the memory.

19. An apparatus for permitting locked transactions within a computer system interfacing processors on a first bus that supports locked transactions with a second bus that does not support locked transactions, comprising:
   a first terminal for connection to the first bus;
   a second terminal for connection to the second bus; and
   a controller connected to the first terminal and the second terminal, the controller operating to:
      detect via the first terminal an indication of a request for a locked transaction requiring a shared resource in the system;
      obtain the resource required for the transaction;
      signal to the processors in the system, when the resource is obtained, an indication of the locked transaction to quiesce the system;
      send via the second terminal the locked transaction for execution; and
      execute locked transactions between the processors on the first bus during execution of the locked transaction on the second bus.

20. The apparatus of claim 19 wherein the controller further operates to send the locked transaction for execution in response to a first signal indicating that other processors connected to the second bus have been quiesced and to send a second signal indicating that a memory connected to the second bus is ready to receive the transaction.

* * * * *